United States Patent
Scheffler et al.

(10) Patent No.: US 8,813,780 B2
(45) Date of Patent: Aug. 26, 2014

(54) SEALED, NON-PERMEABLE FUEL TANK FOR SPARK-IGNITION MOTORS

(75) Inventors: Ronald Scheffler, Beaver Dam, WI (US); Richard Lee Bedford, III, Watertown, WI (US); Anthony S. Weber, Lake Mills, WI (US)

(73) Assignee: Schiller Grounds Care, Inc., Southampton, PA (US)

( * ) Notice: Subject to any disclaimer, the term of this patent is extended or adjusted under 35 U.S.C. 154(b) by 123 days.

(21) Appl. No.: 13/249,781

(22) Filed: Sep. 30, 2011

(65) Prior Publication Data

US 2012/0097682 A1   Apr. 26, 2012

Related U.S. Application Data

(60) Provisional application No. 61/406,813, filed on Oct. 26, 2010.

(51) Int. Cl.
 *F17D 1/00* (2006.01)
 *B60K 15/03* (2006.01)
 *B60K 15/035* (2006.01)
 *B60K 15/04* (2006.01)

(52) U.S. Cl.
 CPC . *B60K 15/03519* (2013.01); *B60K 2015/03523* (2013.01); *B60K 15/03177* (2013.01); *B60K 2015/03296* (2013.01); *B60K 2015/0496* (2013.01); *B60Y 2200/223* (2013.01); *B60K 2015/03046* (2013.01)
 USPC .............................. 137/587; 137/590; 280/834

(58) Field of Classification Search
 USPC .................. 137/587, 590.5, 590; 220/203.02, 220/203.23, 200; 123/516, 518–520; 280/834; 56/16.7
 See application file for complete search history.

(56) References Cited

U.S. PATENT DOCUMENTS

| | | | |
|---|---|---|---|
| 3,910,302 A | 10/1975 | Sudhir | |
| 3,917,109 A * | 11/1975 | MacDonald | ................. 220/746 |
| 4,050,471 A | 9/1977 | Anhegger et al. | |
| 4,095,609 A | 6/1978 | Martin | |
| 4,112,984 A | 9/1978 | Guglia et al. | |
| 4,214,767 A | 7/1980 | Davies, III | |
| 4,274,431 A | 6/1981 | Keller | |
| 4,285,440 A | 8/1981 | Adams | |
| 4,299,247 A | 11/1981 | Keller | |
| 4,413,804 A | 11/1983 | Lanius et al. | |
| 4,416,108 A | 11/1983 | Ghandhi | |
| 4,449,372 A | 5/1984 | Rilett | |
| 4,721,072 A | 1/1988 | Holterman et al. | |
| 4,741,362 A * | 5/1988 | Smola | .......................... 137/587 |
| 4,811,870 A | 3/1989 | Bianco | |

(Continued)

*Primary Examiner* — John Rivell
*Assistant Examiner* — Umashankar Venkatesan
(74) *Attorney, Agent, or Firm* — Panitch Schwarze Belisario & Nadel LLP (57) ABSTRACT

A fuel tank for a spark-ignition motor with a vapor intake port has a tank body having a tank wall enclosing a tank volume. A filler port in a first upper portion of the tank wall establishes a liquid fill-level limit for the tank volume. A vapor dome formed by a second upper portion of the tank wall subtends a vapor space above the liquid fill-level limit. A vapor vent valve is mounted in the vapor dome and is connectable to the vapor intake port. The vapor dome has a shape and size allowing the tank body to tilt from about a horizontal position to about thirty degrees in any direction from the horizontal position before a liquid filling the tank volume to the liquid fill-level limit contacts the vapor vent valve.

13 Claims, 6 Drawing Sheets

(56) References Cited

U.S. PATENT DOCUMENTS

| | | | | |
|---|---|---|---|---|
| 4,834,270 | A | 5/1989 | Messner | |
| 4,922,954 | A | 5/1990 | Blomquist et al. | |
| 4,995,356 | A | 2/1991 | Kronich | |
| 5,025,618 | A | 6/1991 | Braun | |
| 5,074,343 | A | 12/1991 | Tyree, Jr. | |
| 5,242,072 | A | 9/1993 | Koebernik | |
| 5,277,233 | A | 1/1994 | Fleming | |
| 5,408,977 | A | 4/1995 | Cotton | |
| 5,687,778 | A * | 11/1997 | Harris | 141/59 |
| 5,706,776 | A | 1/1998 | Luehring | |
| 5,884,460 | A | 3/1999 | Serravalle et al. | |
| 5,946,894 | A | 9/1999 | Eavenson et al. | |
| 5,996,829 | A * | 12/1999 | Hagano et al. | 220/203.23 |
| 6,003,305 | A | 12/1999 | Martin et al. | |
| 6,170,242 | B1 | 1/2001 | Gordon | |
| 6,260,516 | B1 | 7/2001 | Brister | |
| 6,391,267 | B1 | 5/2002 | Martin et al. | |
| 6,397,791 | B1 | 6/2002 | Brister | |
| 6,575,131 | B2 | 6/2003 | Brister | |
| 6,609,357 | B1 | 8/2003 | Davis et al. | |
| 6,612,324 | B2 | 9/2003 | Szlaga | |
| 6,640,770 | B2 | 11/2003 | Woody | |
| 6,830,085 | B1 | 12/2004 | Majewski | |
| 6,851,458 | B2 * | 2/2005 | Nakamura et al. | 137/587 |
| 6,959,696 | B2 | 11/2005 | Shears et al. | |
| 6,983,868 | B1 | 1/2006 | Harris | |
| 6,986,340 | B2 | 1/2006 | Gracyalny et al. | |
| 7,021,344 | B2 | 4/2006 | Patten | |
| 7,159,577 | B2 | 1/2007 | Haskew et al. | |
| 7,204,394 | B2 | 4/2007 | Tackett | |
| 7,234,452 | B2 | 6/2007 | Mills | |
| 7,263,981 | B2 | 9/2007 | Woody | |
| 7,267,112 | B2 | 9/2007 | Donahue et al. | |
| 7,311,088 | B1 | 12/2007 | Callahan et al. | |
| 7,318,424 | B2 | 1/2008 | Callahan et al. | |
| 7,322,337 | B1 | 1/2008 | Brister et al. | |
| 7,322,338 | B1 | 1/2008 | Brister et al. | |
| 7,424,884 | B2 | 9/2008 | Woody | |
| 7,438,059 | B2 | 10/2008 | Mills et al. | |
| 7,467,620 | B1 * | 12/2008 | Reddy | 123/520 |
| 7,472,694 | B2 | 1/2009 | King | |
| 7,493,894 | B2 | 2/2009 | Davis et al. | |
| 7,520,293 | B2 * | 4/2009 | Hilderley et al. | 137/202 |
| 7,527,044 | B2 | 5/2009 | Dunkle et al. | |
| 7,568,472 | B2 | 8/2009 | Woody | |
| 7,610,905 | B2 | 11/2009 | Callahan et al. | |
| 7,641,285 | B2 | 1/2010 | Jacobs | |
| 7,762,240 | B2 | 7/2010 | Callahan et al. | |
| 7,779,820 | B2 * | 8/2010 | Rittershofer | 123/516 |
| 8,286,658 | B2 * | 10/2012 | Devall | 137/39 |
| 2003/0015536 | A1 | 1/2003 | Tekulve et al. | |
| 2003/0021638 | A1 | 1/2003 | Levine | |
| 2005/0034438 | A1 | 2/2005 | Burke et al. | |
| 2006/0124644 | A1 * | 6/2006 | Dehn | 220/259.3 |
| 2006/0213553 | A1 | 9/2006 | Mills et al. | |
| 2006/0254641 | A1 | 11/2006 | Callahan et al. | |
| 2007/0017918 | A1 | 1/2007 | Kirk et al. | |
| 2007/0283937 | A1 | 12/2007 | Callahan et al. | |
| 2008/0141921 | A1 | 6/2008 | Hinderks | |
| 2008/0251053 | A1 | 10/2008 | Shears et al. | |
| 2008/0251055 | A1 | 10/2008 | Schmalz et al. | |
| 2008/0276911 | A1 | 11/2008 | Woody | |
| 2008/0302341 | A1 | 12/2008 | Reddy | |
| 2009/0084363 | A1 * | 4/2009 | Reddy | 123/520 |
| 2009/0206081 | A1 | 8/2009 | Snyder et al. | |
| 2010/0024898 | A1 | 2/2010 | Bansal et al. | |
| 2010/0095937 | A1 | 4/2010 | Hudak et al. | |
| 2010/0126477 | A1 * | 5/2010 | Reddy | 123/520 |
| 2010/0155434 | A1 | 6/2010 | Bradford | |
| 2010/0236658 | A1 | 9/2010 | Voss, III | |
| 2010/0252006 | A1 * | 10/2010 | Reddy | 123/519 |

* cited by examiner

SEALED, NON-PERMEABLE FUEL TANK FOR SPARK-IGNITION MOTORS

CROSS-REFERENCE TO RELATED APPLICATIONS

This application is related to U.S. Provisional Patent Application No. 61/406,813, filed Oct. 26, 2010, incorporated herein by reference and claims the earlier filing date of the provisional application.

BACKGROUND OF THE INVENTION

The present invention relates generally to sealed non-permeable fuel tanks for land-based, spark-ignition engine fuel systems. More particularly, the present invention relates to a fuel tank that vents emissions directly to the vapor port of a lawn mower spark-ignition engine.

Starting in the year 2011, Environmental Protection Agency ("EPA") has requested that manufacturers find a solution to the issues of emissions. (See, Control of Emissions from Nonroad Spark-Ignition Engines and Equipment; Final Rule, 73 Federal Register 59034-59380, (Oct. 8, 2008)). As a result the EPA mandates that manufacturers of lawn and garden products meet new evaporative emissions standards and not have evaporation of reactive organic gases released into the atmosphere, by permeation emissions and by venting emissions.

At present permeation emissions result from the penetration of reactive organic gas molecules through the walls of fuel system components and evaporation of the gas molecules on the out side surfaces of fuel tanks, fuel lines, seals and gaskets. Steel tanks do not have permeation issues but the components used with these permit vapors to escape.

There are vented emissions which are also called or referred to as breathing loss or venting loss. These emissions come from direct evaporation of reactive organic gases such as gasoline from a liquid free surface into a gaseous phase which escapes from a fuel tank vent, a carburetor bowl, or other intake systems.

There are also running loss emissions which are fuel vapors expelled to the atmosphere as a result of fuel heating and agitation during operation.

Thus, for the start of 2011, EPA is requiring low permeation fuel tanks, low permeation fuel hoses, running loss controls, sealing and tethered caps called Phase 3 EVAP requirements. In the past fuel systems could have tank venting, fuel supply head, fuel consumption, and fuel vapor generation vented to atmosphere. These new requirements do not permit venting to air; in fact, the tanks must be sealed.

For conventional, present-day designs of fuel systems and tanks, fuel vapors are vented from a fuel tank to the atmosphere to avoid a build up of pressure in the fuel tank. In some instances, metal tanks have bowed out and plastic tanks have deformed in to more of a round shape when venting was not permitted. It is common practice to vent vapor in a fuel tank to atmosphere when an engine is not running to prevent the tank from reaching pressure limits on pressure in the tank and to prevent carburetor type engines from flooding.

Accordingly, there is a need in the art for a sealed non-permeable fuel system including a fuel tank that is not vented to the atmosphere.

BRIEF SUMMARY OF THE INVENTION

Briefly stated, one embodiment of the present invention is directed to a fuel tank for a spark-ignition motor having a vapor intake port. The fuel tank comprises a tank body having a tank wall enclosing a tank volume. A filler port is in a first upper portion of the tank wall. The filler port establishes a liquid fill-level limit for the tank volume. A vapor dome is formed by a second upper portion of the tank wall. The vapor dome subtends a vapor space above the liquid fill-level limit. A vapor vent valve is mounted in the vapor dome. The vapor vent valve is connectable to the vapor intake port. The vapor dome has a shape and size allowing the tank body to tilt from about a horizontal position to about thirty degrees in any direction from the horizontal position before a liquid filling the tank volume to the liquid fill-level limit contacts the vapor vent valve.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to embodiments of the invention, examples of which are illustrated in the accompanying drawings. The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise. The words "and/or" as used herein refers to and encompasses any and all possible combinations of one or more of the associated listed items. The words "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The words "right," "left," "lower" and "upper" designate directions in the drawings to which reference is made. The words "inwardly" and "outwardly" refer to directions toward and away from, respectively, the geometric center of the structure to which reference is made, and designated parts thereof. The terminology includes the words noted above, derivatives thereof and words of similar import.

Although the words first, second, etc., are used herein to describe various elements, these elements should not be limited by these words. These words are only used to distinguish one element from another. For example, a first shaft could be termed a second shaft, and, similarly, a second shaft could be termed a first shaft, without departing from the scope of the present invention.

As used herein, the words "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The following description is directed towards various embodiments of a sealed non-permeable fuel tank for spark-ignition motors in accordance with the present invention.

Referring to the drawings in detail, where the same numerals indicate like elements throughout, there is shown in FIGS. 1-10 a first preferred embodiment of a sealed non-permeable fuel tank generally designated 10, and hereinafter referred to as the "fuel tank" 10 in accordance with the present invention.

Figure 1:
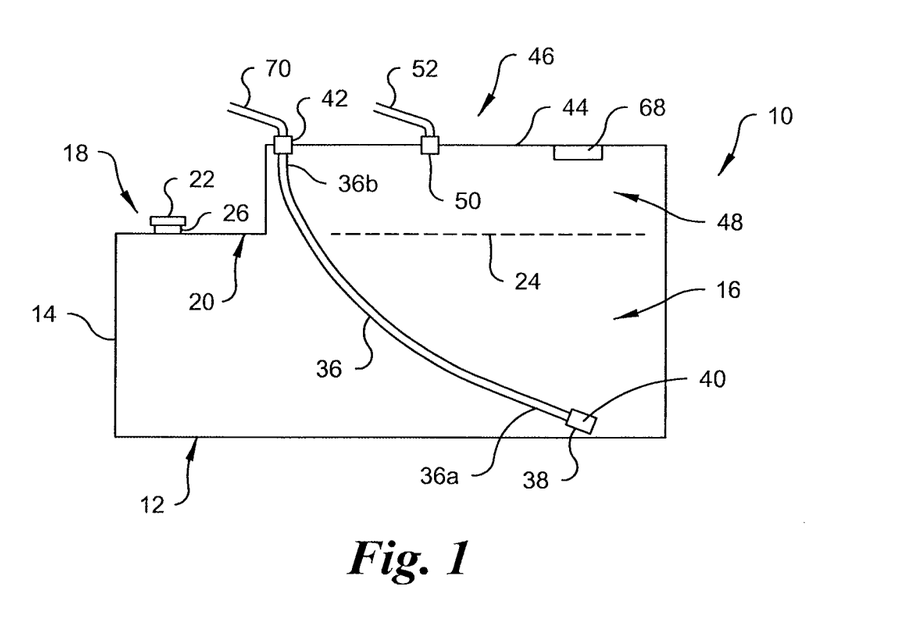
FIG. 1 is a schematic block diagram of a sealed, non-permeable fuel tank for spark-ignition motor in accordance with a preferred embodiment of the present invention.
Figure 2:
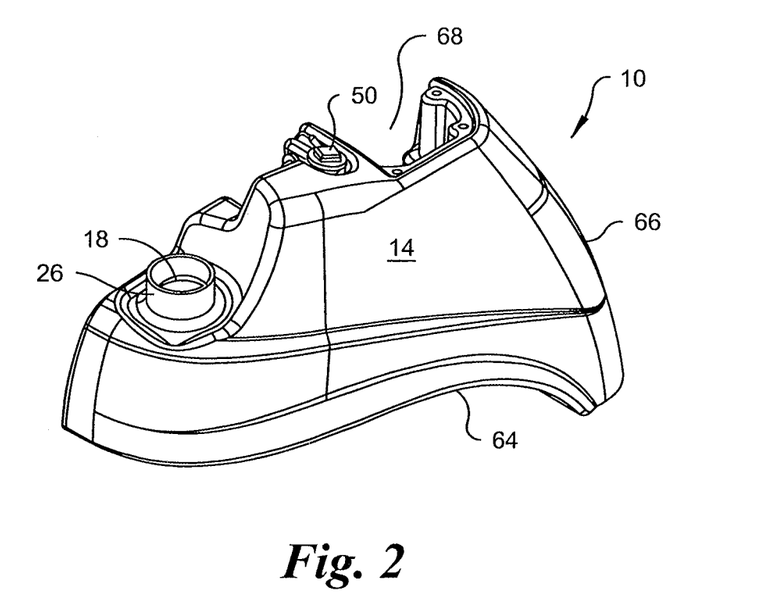
FIG. 2 is a top, right-side perspective view of a sealed, non-permeable right side fuel tank for a lawn mower having spark-ignition motor in accordance with a preferred embodiment of the present invention.
Figure 3:
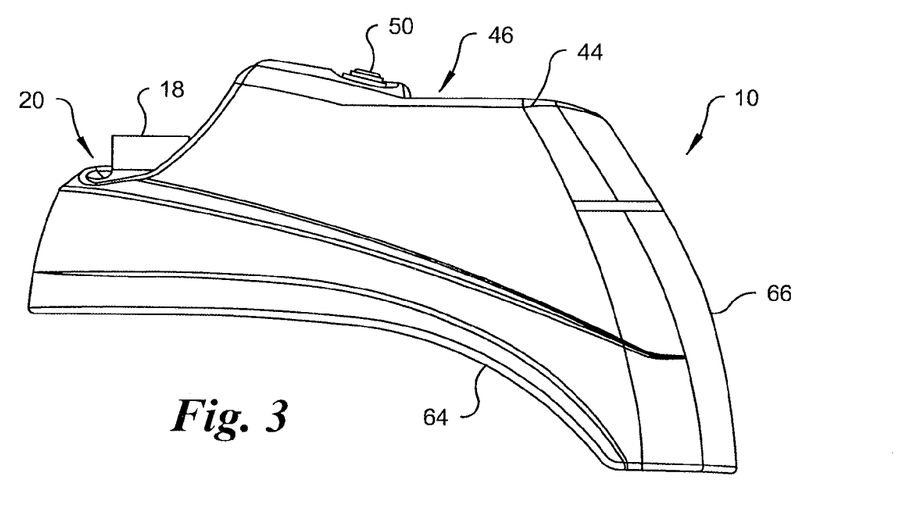
FIG. 3 is a right side elevation view of the fuel tank of FIG. 2.
Figure 4:
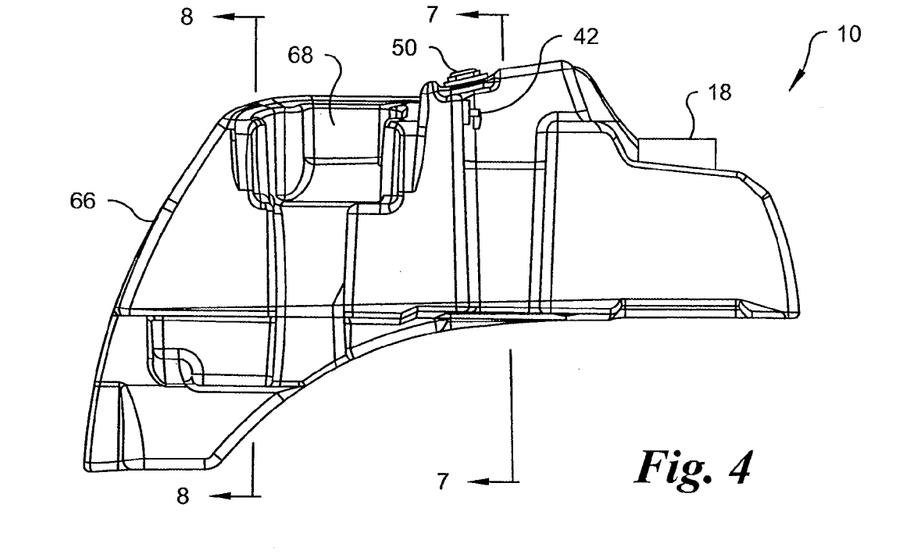
FIG. 4 is a left side elevation view of the fuel tank of FIG. 2.
Figure 5:
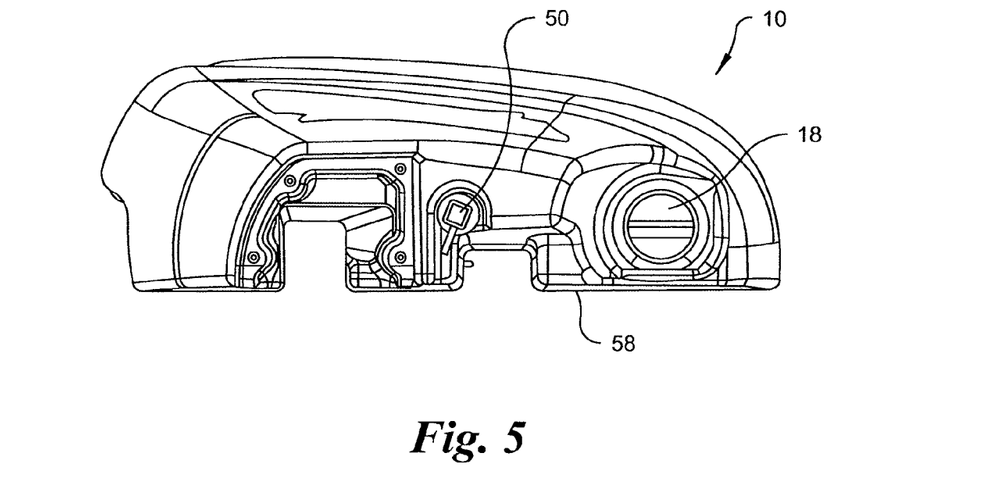
FIG. 5 is a top plan view of the fuel tank of FIG. 2.
Figure 6:
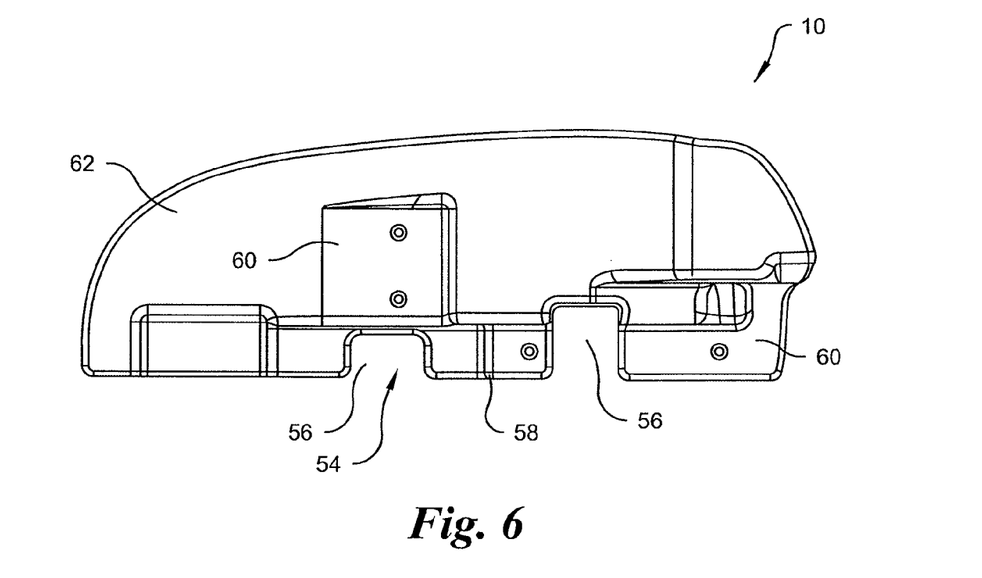
FIG. 6 is a bottom plan view of the fuel tank of FIG. 2.
Figures 7, 8:
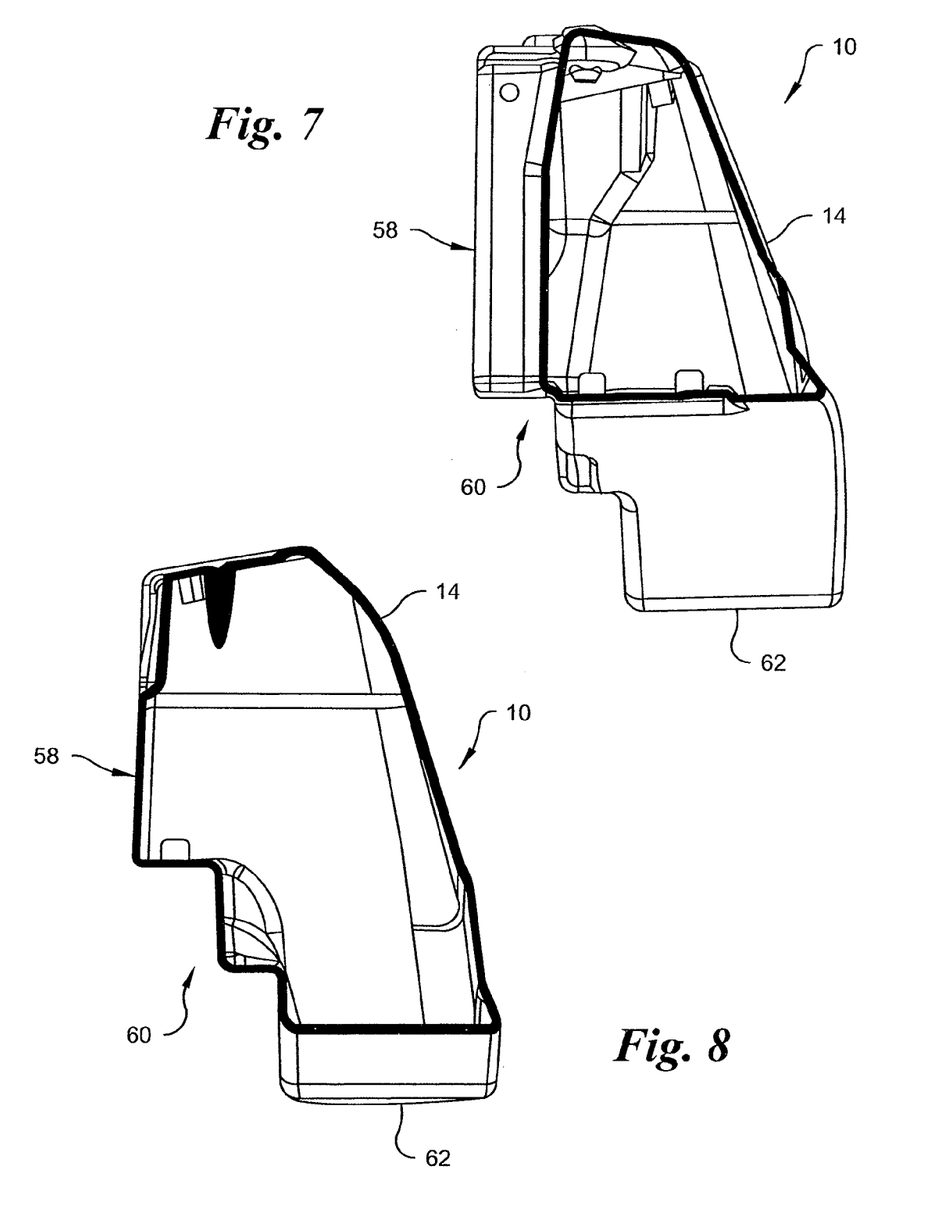
FIG. 7 is a cross sectional view in elevation of the fuel tank of FIG. 2 taken along the lines A-A.
FIG. 8 is a cross sectional view in elevation of the fuel tank of FIG. 2 taken along the lines D-D.
Figure 9A:
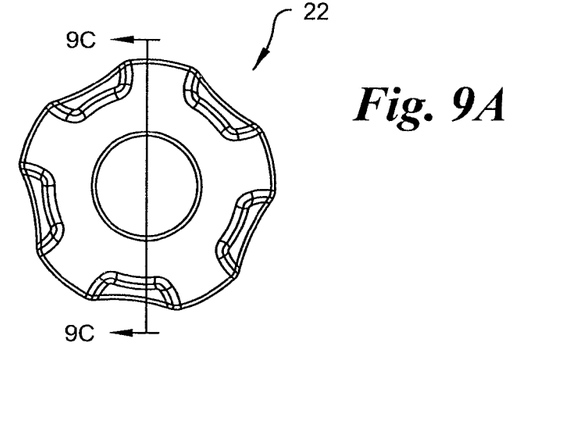
FIGS. 9A, 9B, and 9C, respectively, are a top plan view, side elevation view and side cross sectional view of the Fuel Cap of the fuel tank of FIG. 2.
Figure 9B:
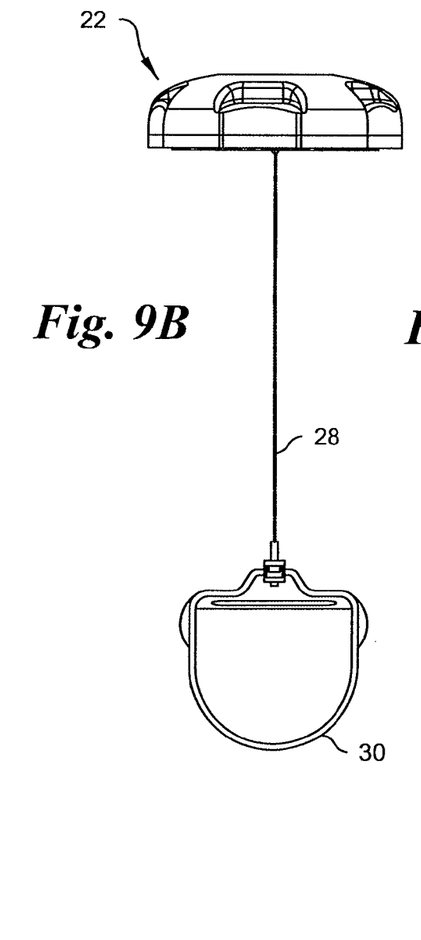
Figure 9C:
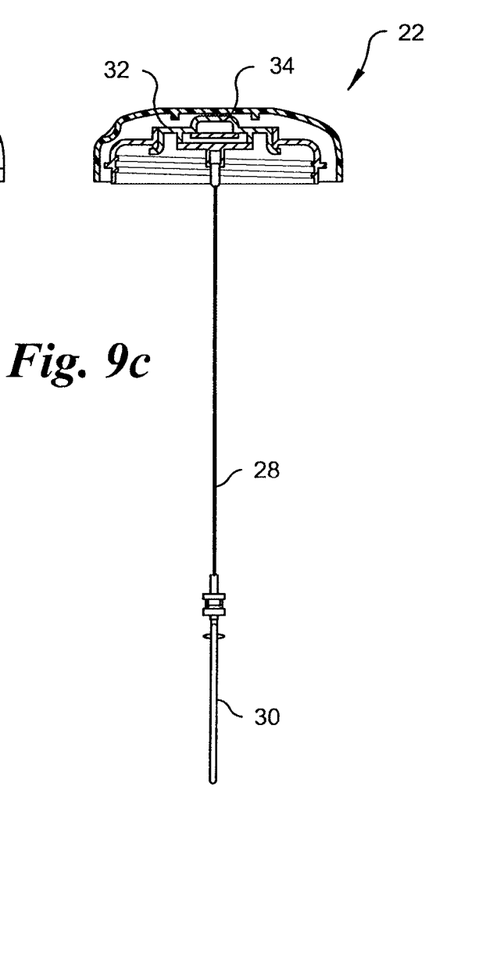
Figure 10:
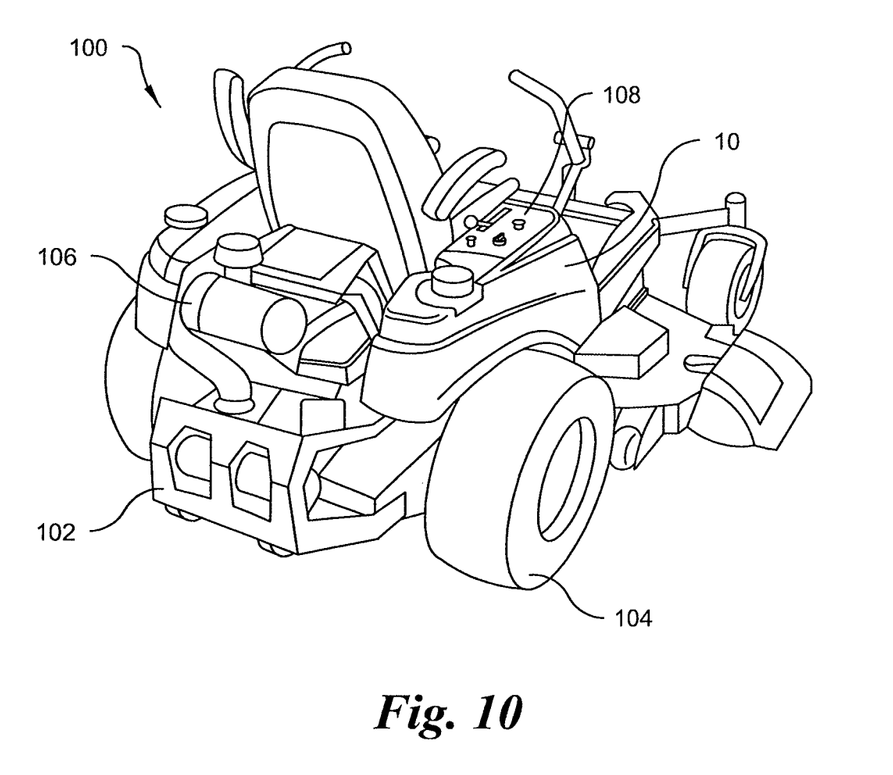
FIG. 10 is a rear, right-side, top perspective view of the fuel tank of FIG. 2 mounted to a lawn mower in accordance with a preferred embodiment of the present invention.

The fuel tank 10 is configured for use with a spark-ignition motor 106 having a vapor intake port (not shown) and, in particular, is configured for use with a zero-turn lawn mower 100 such as the lawn mower shown in FIG. 10. However, the fuel tank 10 of the present invention is not limited to use with a spark-ignition lawn mower engine. The size and shape of the fuel tank may be altered to control emissions from other non-road spark-ignition engines and equipment including lawn and garden products such as tillers, blowers and the like.

The fuel tank 10 comprises a tank body 12 having a tank wall 14 enclosing a tank volume 16. The tank wall 14 may be fabricated from a number of materials including multi-layered polymeric materials or plastic. Various metals may also be used but have the draw back of being costly to form and join due to geometry requirements. Preferably, the tank body is fabricated from a multi-layer polymeric material that utilizes an inner and outer layer of crosslink polyethylene with a barrier material in the middle for permeation resistance. The use of a multi-layer polymeric material provides for ease of molding the tank wall using methods such as injection molding, rotational molding, over molding, compression molding, vacuum forming, blow molding, cast forming, etc. During molding, the multi-layer material may be reinforced to provide impact resistance in addition to non-permeation.

In some embodiments, the tank volume 16 may be undivided. In such embodiments, the tank volume 16 constitutes a contiguous space that is not partitioned or segmented into separate chambers interconnected by fluid passageways. In some embodiments, the undivided volume 16 may have internal structural members performing a support or baffling function. In other embodiments, the tank volume 16 may comprise physically separate chambers in fluid communication.

A filler port 18 is provided in a first upper portion 20 of the tank wall 14 and is sealed by a removable fuel cap 22. The filler port 18 establishes a liquid fill-level limit 24 for the tank volume 16. The liquid fill-level limit 24 occurs when the volume of liquid in the fuel tank 10 reaches the maximum liquid volume the tank body 12 may contain when the tank 12 is horizontal. When the fuel tank 12 is filled to the liquid fill-level limit 24, the location of the upper surface of the liquid in the fuel tank 12 is coincident with the location of the filler port 18.

In some embodiments, the filler port 18 has a neck 26 extending outwardly from the tank wall 14. Preferably, the neck 26 is recessed in the tank wall 14 and is threadedly and sealedly engagable with the fuel cap 22. In some embodiments, the fuel cap 22 may be attached to the fuel tank 10 by a tether 28 having an anchor 30 within the tank. (See FIGS. 9A-9C) In other embodiments, the tether 28 may be attached to an external surface of the fuel tank 10. The fuel cap 22 may provide audible and tactile feedback when being rotated to seal the filler port 18. The fuel cap 22 may also have a air inlet valve 32 and a pressure relief valve 34.

An internal fuel line 36 is provided within the tank body 12. A weight 38 and an in-line filter 40 may be provided at the lower end 36a of the internal fuel line 36. The upper end 36b of the fuel line 36 is attached to a fuel line port 42 penetrating the tank wall 14.

A vapor dome 44 is formed by a second upper portion 46 of the tank wall 14. The vapor dome 44 subtends a vapor space 48 above the liquid fill-level limit 24. The vapor space 48 comprises suggestedly approximately at least five percent of the tank volume 16, desirably approximately at least ten percent or more of the tank volume 16 and preferably between approximately ten to fifteen percent of the tank volume 16.

A vapor vent valve 50 is mounted in the vapor dome 44. Desirably, the vapor dome 44 has a shape and size allowing the tank body 12 to tilt from about a horizontal position to about thirty degrees in any direction from the horizontal position before a liquid filling the tank volume 16 to the liquid fill-level limit 24 contacts the vapor vent valve 50. Preferably, the vapor dome 44 may have a shape and size allowing the tank body 12 to tilt between approximately thirty degrees to forty-five degrees in any direction from the horizontal position and less preferably up to sixty but no more than seventy degrees without liquid reaching the vapor vent valve 50.

The vapor vent valve 50 may be connected to the vapor intake port (not shown) of the spark-ignition motor by an external vapor line 52 providing a fluid passageway between the vapor vent valve 50 and the vapor intake port. In some embodiments, the vapor vent valve 50 may be a combination valve comprising a vent valve and a check valve. In other embodiments, in addition to the vapor vent valve 50, a separate check valve may be provided to prevent liquid from entering the vapor vent line. In still other embodiments, a vapor absorber (not shown) may be provided in the vapor vent line to serve as a reservoir to collect emissions when the spark-ignition motor is not operating.

Referring to FIG. 10, in addition to the fuel tank 10 being configured for emission control, in some embodiments the tank body 12 may be further configured to have a mount 54 fixedly attaching the fuel tank 10 to a chassis 102 of a lawn mower 100 having at least one wheel 104 driven by a spark-ignition motor 106. The mount 54 comprises a first set of inserts 56 that are molded in the tank wall 14 on the in-board facing side 58 and a second set of inserts 60 that are molded in the bottom 62 of the tank wall 14. The inserts 56, 60 are configured to mate with corresponding structure on the chassis 102 and are secured to this structure by conventional fasteners, such as a screw or bolt.

Preferably, the fuel tank 10 is mounted above the at least one wheel 104 and has a bottom portion 64 of the tank wall 16 configured to conform to a curvature of the at least one wheel 104. In some embodiments, the fuel tank 10 may have additional features such as the front portion 66 of the tank wall 16 having a generally arcuate shape. Alternatively, or in addition, and/or the tank wall 16 having a recess 68 for mounting a mower control panel 108 in fluid communication with an external fuel line 70 extending between the fuel line port 42 of the fuel tank 10 and the fuel intake port (not shown) of the motor 106 and with the external vapor line 52 extending between the vapor vent valve 50 and the vapor intake port (not shown) of the motor 106.

The foregoing detailed description of the invention has been disclosed with reference to specific embodiments. However, the disclosure is not intended to be exhaustive or to limit the invention to the precise forms disclosed. Those skilled in the art will appreciate that changes could be made to the embodiments described above without departing from the broad inventive concept thereof. Therefore, the disclosure is intended to cover modifications within the spirit and scope of the present invention as defined by the appended claims.

We claim:

1. A fuel tank for a spark-ignition motor having a vapor intake port, the fuel tank comprising:
    a tank body having a tank wall enclosing a tank volume;
    a filler port at a filler-port location in a first upper portion of the tank wall, the filler-port location spaced radially from a vertical axis passing through a geometric center of the tank when the tank is in a horizontal position, the filler port establishing a liquid fill-level limit for the tank volume;
    a vapor dome formed by a second upper portion of the tank wall, the vapor dome subtending a vapor space above the liquid fill-level limit; and
    a vapor vent valve mounted in the vapor dome, the vapor vent valve connectable to the vapor intake port,
    the vapor dome having a shape and size allowing the tank body to tilt from about the horizontal position to about thirty degrees from the horizontal position in at least two orthogonal directions before a liquid filling the tank volume to the liquid fill-level limit contacts the vapor vent valve.

2. The fuel tank according to claim 1, wherein the tank volume is undivided.

3. The fuel tank according to claim 2, wherein the vapor space comprises at least ten percent of the tank volume.

4. The fuel tank according to claim 1, wherein the vapor vent has a check valve.

5. The fuel tank according to claim 1, wherein an external vapor line provides a fluid passageway between the vapor vent valve and the vapor intake port.

6. The fuel tank according to claim 5, wherein a vapor absorber is in the vapor line.

7. The fuel tank according to claim 1, wherein the filler port is sealed by a removable fuel cap.

8. The fuel tank according to claim 7, wherein the fuel cap is tethered to the fuel tank and comprises an air inlet valve and a pressure-relief valve.

9. The fuel tank according to claim 7, wherein the fuel cap threadedly engages the filler port and provides audible and tactile feedback when being rotated to seal the filler port.

10. The fuel tank according to claim 1, further comprising an internal fuel line having a weighted lower end with an in-line filter and an upper end attached to a fuel line port penetrating the tank wall.

11. The fuel tank according to claim 1, further comprising a mount fixedly attaching the tank wall to a chassis of a lawn mower having a spark-ignition motor with a fuel intake port and a vapor intake port and an external fuel line in fluid communication with the fuel intake port and the external vapor line is in fluid communication with the vapor intake port.

12. The fuel tank according to claim 11, wherein the lawn mower has at least one wheel driven by the mower and the fuel tank is mounted above the at least one wheel, a bottom portion of the tank wall is configured to conform to a curvature of the at least one wheel, a front portion of the tank wall has a generally arcuate shape.

13. The fuel tank according to claim 1, wherein the lawn mower has a control panel in fluid communication with the fuel line and the tank wall has a recess within which the control panel is mounted.

* * * * *